April 23, 1929.　　　A. W. HUDSON　　　1,710,222
POWER LIFT
Filed Dec. 18, 1924　　　2 Sheets-Sheet 1

Inventor
ARTHUR W. HUDSON.
By Lyon & Lyon
Attorneys.

April 23, 1929.  A. W. HUDSON  1,710,222
POWER LIFT
Filed Dec. 18, 1924  2 Sheets-Sheet 2

Inventor
ARTHUR W. HUDSON.
By Lyon & Lyon
Attorneys.

UNITED STATES PATENT OFFICE.

ARTHUR W. HUDSON, OF LOS ANGELES, CALIFORNIA, ASSIGNOR TO THE KILLEFER MANUFACTURING COMPANY, OF LOS ANGELES, CALIFORNIA, A CORPORATION OF CALIFORNIA.

POWER LIFT.

Application filed December 18, 1924. Serial No. 756,661.

This invention relates to power lifts for use in connection with agricultural implements wherein the pull or normal draft of the implement is utilized to raise the ground working tools from the ground, and in which implement means are provided for maintaining the ground working wheels in engagement with the ground when the power lift is actuated to raise the said ground working tools. In the operation of such a plow, the plowshare may encounter obstructions, which necessitates the raising of the tools from the ground so that the same may be passed over. The use of a power lift in connection with ground working tools is also essential when it is desired to turn the plow or when it is desired to avoid agricultural growth which it is not desired to uproot.

In most implements for ground working tools as heretofore constructed or employed in which a power lift has been used, it has been necessary to employ gripping members or grabs on the ground working wheels so that the same will rotate when the normal draft of the implement is applied to actuate the power lift to raise the ground working tools from the ground. The use of ground gripping devices on ground wheels makes it difficult to draw the said implement over the ground and seriously disrupts the surface of the ground, particularly in the case of the wheel which is running over the ground already plowed. The use of these gripping devices is also an expense which it is desired to eliminate from ground working implements of this type. This invention therefore comprehends a certain association of parts of the power lift mechanism whereby the horizontal component of torque applied in actuating the power lift is reduced to a minimum and whereby the vertical component of force of that torque is of sufficient magnitude to at all times maintain the ground working wheels in engagement with the ground so that the same will rotate during the normal draft of the implement without the use of said ground gripping devices heretofore employed.

It is therefore an object of this invention to construct a power lift, having an arrangement of parts thereof as above referred to, so that a vertical component of force of the torque required in actuating the power lift of sufficient magnitude will be obtained to maintain the ground working tools in engagement with the ground so that the same will continuously rotate during the actuation of the power lift without the employment of ground gripping devices.

A further object of this invention is to provide a construction of a power lift which is comparatively inexpensive and requires a minimum of draft power to actuate.

Other objects and advantages of this invention will be apparent from the following detailed description of a preferred embodiment thereof, as illustrated in the accompanying drawings and pointed out in the appended claim.

Figure 2:
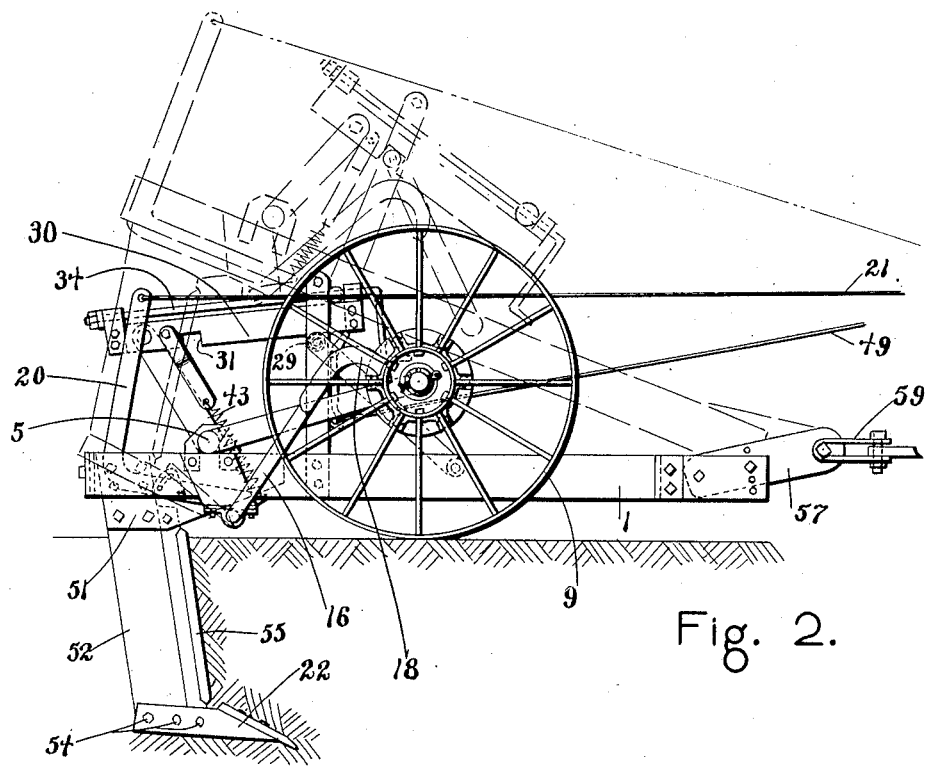
Fig. 2 is a side elevation thereof, illustrating the ground working tools in the lowered position and showing the position of the parts when the said ground working tools are raised, in dotted lines.
Figure 1:
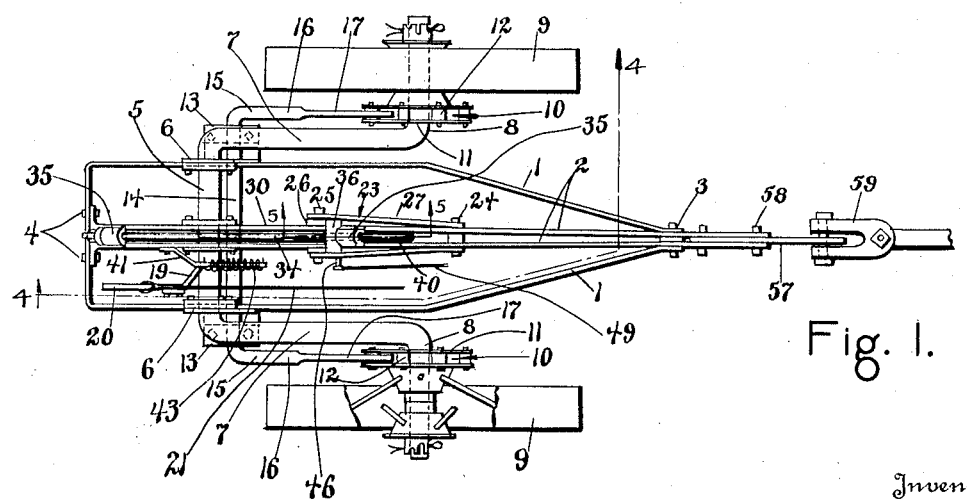
Fig. 1 is a plan view of an agricultural implement embodying this invention.
Figure 3:
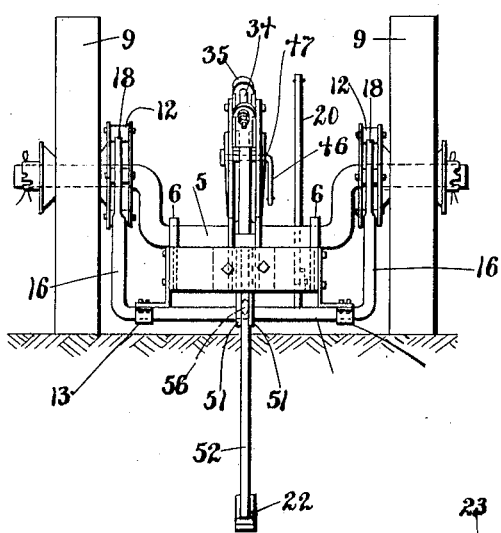
Fig. 3 is a rear elevation thereof.
Figure 5:
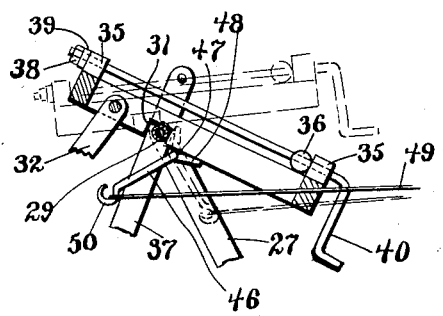
Fig. 5 is an enlarged fragmental sectional side elevation taken substantially on the line 5—5 of Fig. 1.
Figure 4:
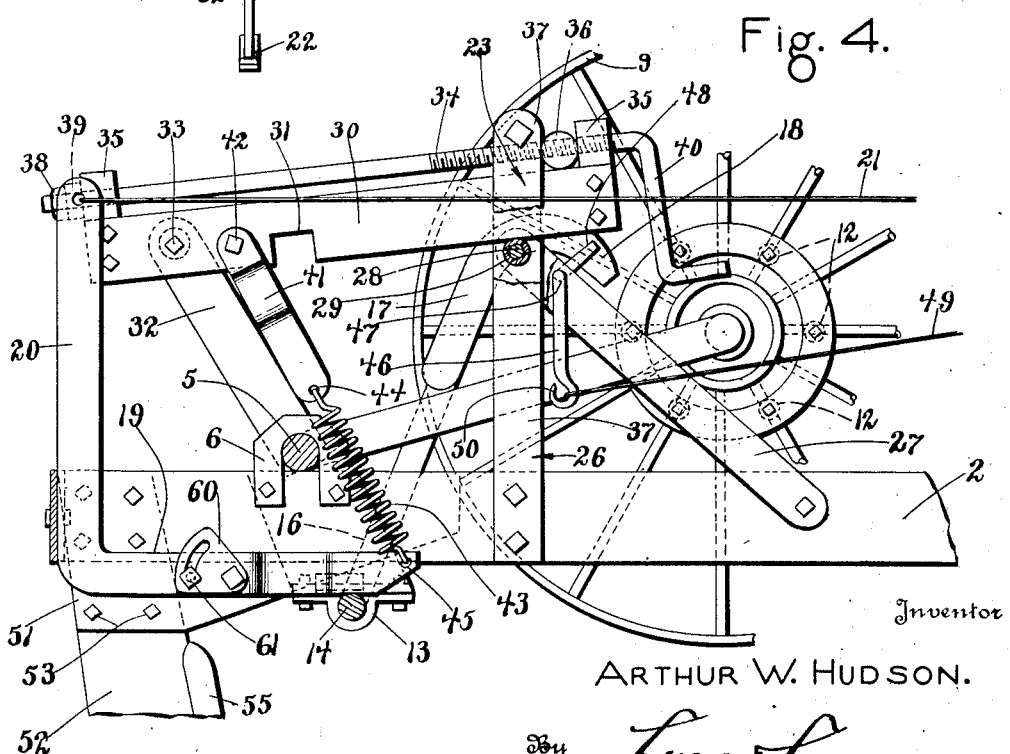
Fig. 4 is an enlarged fragmental sectional side elevation taken substantially on the line 4—4 of Fig. 1.

A preferred construction of this invention shown in the drawings comprises an outer frame member 1 and a pair of center or medial frame members 2, said outer frame member being bent inward to be joined with the medial frame members 2 in some such manner as illustrated at 3, the said medial frame members 2 being also secured to the frame member 1 as illustrated at 4. Journaled on the upper side of the member 1 in suitable bearings is a crank axle 5. A pair of center bearing clips 6 are provided for holding the said journaled bearings. The said crank axle 5 is bent forwardly to form the crank arm 7, to which transverse extension 8 thereof a pair of ground working wheels 9 are loosely journaled in any desired manner. Securely affixed to the ground wheels 9 are a pair of racks 10 comprising a plate 11 and a plurality of lugs integral with the shell of the wheels 9, the lugs and plate 11 being spaced apart by means of bushings or rollers 12. The rollers 10, 11 and 12 form pin wheels or ratchet wheels.

Secured to the under side of the frame member 1 slightly in advance of the position of the crank axle 5 in the center bearing clips 6 by means of a pair of stirrup clips 13, is a stirrup axle 14 bent forwardly as at 15 to form a pair of stirrup arms 16, to which stirrup arms 16 a pair of stirrups 17 are securely welded or affixed in any other suitable manner, the said stirrups 17 being curved at their forward end to form a pair of hooks 18 engageable with the bushings 12 by means of an arm 19 welded or otherwise secured to the stirrup axle 14, said arm 19 being curved upward to form the actuating lever 20 at the upper end of which lever 20 the operating cord 21 is secured. It will therefore be apparent that by pulling on the cord 21 the arm 20 is pulled forwardly, rotating the stirrup axle 14 and causing the said hooks 18 to pass between the rings 11 and engage a bushing 12, the end of the hook 18 being over the bushing 12 and the axle 14 secured to the bushing 12, the said frame is elevated, thereby raising the ground working tools 22 from the ground, and on continued raising the arm 19 is engaged with the crank axle 5, preventing any further rotation thereof and withdrawing the hooks 18 from engagement with the bushings 12. The frame is by this means rotated around the center of the ground working wheels 9 as the center of rotation, the rearward end of which frame is raised during the said rotation. By connecting the transverse extension 8 of the axle 5 to a point below the frame member 1 and to a point slightly in advance of the crank axle 5, through the medium of the stirrups 17 and stirrup arms 16, a downward component force is applied to the said transverse extension 8 of the axle 5 sufficient to maintain the ground working wheels 9 in engagement with the ground at all times during the said lifting operation and likewise this arrangement of parts to lift the said frame during the rotation thereof insures that the said rotation will be effected without the use of grouters, this latter being particularly accomplished by the positioning of the stirrup axle 14 in advance of the position of the crank axle 5. By this means it is assured that a minimum of draft force will be required to raise the said ground working tool 22 from within the ground.

Means are provided for holding the said ground working tools 22 elevated from the ground, which means are preferably as follows: A holding frame 23 is secured to the medial frame members 2, as indicated at 24 and 25, and comprises a vertically extending U bracket 26 to which U-shaped bracket 26 a pair of supporting arms 27 are fixed on a pin 28, upon which pin a bushing 29 is positioned to space the said arms 27 and the straight portions of the U-shaped bracket 26. A slide bar 30 is fitted within the U-shaped bracket 26 and adapted to slide on the bushing 29. A recess 31 is cut in the slide bar 30 and as the said frame is elevated the slide bar 30 is slid forward within the downwardly extending members of the bracket 26 until the recess 31 thereof slides over the bushing 29 in which position the arm 19 engages the crank axle 5 and releases the hooks 18 from engagement with the bushings 12. It will therefore be obvious that the bushing 29, being engaged within the recess 31, the said ground working tools 22 are held in the elevated position. In order to slide the bar 31 forward during the raising of the ground working tools 22, a tumbling bar 32 is secured to the crank axle 5 and pivoted to the slide bar 30, as indicated at 33. Means are provided for regulating the depth of penetration of the ground working tools 22 into the ground, which means are preferably as follows:

A sliding bar screw 34 is loosely journaled within the pair of brackets 35 secured to the respective ends of the sliding bar 30. A sliding bar nut 36 is screw-threaded to the said screw 34 in position to be engaged with the sides 37 of the downwardly extending arms of the U-shaped bracket 26, and also to be engaged at their other side by the brackets 35. On the opposite end of the screw 34 a retaining nut 38 and ball thrust bearing 39 are provided. A crank 40 formed by bending the screw 34 is provided to rotate the said screw 34 in the nut 36. It will therefore be apparent that as the screw 34 is turned, the depth of the penetration of the ground working tools will be regulated. Means are provided for holding the slide bar 30 from becoming disengaged with the bushing 29, which means comprise a bracket 41 pivotally secured to the slide bar 30, as indicated at 42, and being adapted to be connected with the coil spring 43 as at 44, which coil spring 43 is secured to the arm 19, as illustrated at 45.

Means are provided for allowing the ground working tools to fall into the ground, which means preferably comprise an arm 46 pivotally secured to the supporting bars 27, as indicated at 47, and being provided with an extension 48 adapted to engage the under side of the sliding bar 30 when the said sliding bar 30 is in the forward position, so that the recess 31 is in engagement with the bushing 29. A rope or cable 49 is attached to the lower end 50 of the said arm 46 so that when it is desired to lower the frame to the ground the operator pulls on the cord 49, causing the extension 48 to engage the under side of the slide bar 30 and elevate the same so that the recess 31 becomes disengaged from the bushing 29; the slide bar then is free to slide rearward and allow the tools to drop into the ground. The ground working tools 22 are supported on the medial frame members 2 by means of a pair of gusset plates 51 to which the ground working tool standard 52 is secured, as indicated at 53. To the lower end of the standard 52 the ground working tools 22 are secured in any desired manner, as illustrated at 54. A shin 55 is secured to the standard 52 to aid in the cutting of the ground during the cultivating operation.

As the construction methods used in the production of a power lift for agricultural purposes do not permit of fine or close regulation of size of parts and exact location thereof, I have provided means for regulating the point at which the hooks 18 are disengaged from the bushings 12 when the said power lift mechanism is actuated to elevate or raise the ground working tools, which means comprise a slotted plate 60 pivotally secured to the arm 19 in position to engage the stirrup axle 14. The said plate 60 is adjusted in position by means of a set screw 61 positioned in the slot of the plate 60 and adapted to be screw-threaded to the said arm 19. By this means a simple and effective regulation of the point of release of the hooks 18 from the bushings 12 is provided.

In order to maintain the hooks 18 always in alignment with the bushings 12, a shoulder 56 is welded or otherwise secured to the stirrup axle 14, which shoulder 56 is adapted to fit closely between the gusset plates 51.

Means are provided for hitching this instrument to a source of draft power, which means comprise a link 57 secured within the medial frame members 2, as indicated at 58. To the forward end of the link 57 a clevis 59 or other suitable device is secured in any desired manner.

Having fully described the preferred embodiment of this invention, it is to be understood that I do not wish to be limited to the exact construction herein disclosed, which may obviously be varied without departing from the spirit of the invention, as set forth in the appended claim.

I claim:

In an implement of the class described, the combination of a frame, a crank axle journaled in bearings transversely of the frame, ground wheels journaled on the axle, a ground working tool supported by the frame, a stirrup axle journaled in bearings transversely of the frame in advance of and below the crank axle, pin wheels secured to the said ground wheels, means for securing the stirrup axle to the said pin wheels so that on rotation of the wheels the crank axle is rocked to elevate the said tool, and means secured to the said stirrup axle for rotating the same, and which means are adapted to engage the said crank axle on predetermined rocking thereof so as to release the said means for securing the stirrup axle to the said pin wheels.

Signed at Los Angeles, Calif., this 10th day of December, 1924.

ARTHUR W. HUDSON.